United States Patent
Weber

(10) Patent No.: US 10,063,786 B2
(45) Date of Patent: Aug. 28, 2018

(54) VEHICLE VISION SYSTEM WITH ENHANCED LOW LIGHT CAPABILITIES

(71) Applicant: MAGNA ELECTRONICS INC., Auburn Hills, MI (US)

(72) Inventor: Christian Weber, Karlsbad (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/911,462

(22) Filed: Mar. 5, 2018

(65) Prior Publication Data

US 2018/0198969 A1  Jul. 12, 2018

Related U.S. Application Data

(63) Continuation of application No. 15/790,174, filed on Oct. 23, 2017, now Pat. No. 9,912,876, which is a continuation of application No. 14/290,028, filed on May 29, 2014, now Pat. No. 9,800,794.

(60) Provisional application No. 61/830,375, filed on Jun. 3, 2013.

(51) Int. Cl.
| | |
|---|---|
| *H04N 5/00* | (2011.01) |
| *H04N 5/235* | (2006.01) |
| *B60R 1/00* | (2006.01) |

(52) U.S. Cl.
CPC ............. *H04N 5/2353* (2013.01); *B60R 1/00* (2013.01)

(58) Field of Classification Search
CPC ................................ H04N 5/2353; B60R 1/00
USPC ......................................................... 348/148
See application file for complete search history.

(56) References Cited

U.S. PATENT DOCUMENTS

| | | |
|---|---|---|
| 5,530,240 A | 6/1996 | Larson et al. |
| 5,535,314 A | 7/1996 | Alves et al. |
| 5,550,677 A | 8/1996 | Schofield et al. |
| 5,668,663 A | 9/1997 | Varaprasad et al. |
| 5,670,935 A | 9/1997 | Schofield et al. |
| 5,724,187 A | 3/1998 | Varaprasad et al. |
| 5,949,331 A | 9/1999 | Schofield et al. |
| 6,329,925 B1 | 12/2001 | Skiver et al. |
| 6,690,268 B2 | 2/2004 | Schofield et al. |
| 7,038,577 B2 | 5/2006 | Pawlicki et al. |
| 7,184,190 B2 | 2/2007 | McCabe et al. |
| 7,195,381 B2 | 3/2007 | Lynam et al. |
| 7,255,451 B2 | 8/2007 | McCabe et al. |
| 7,274,501 B2 | 9/2007 | McCabe et al. |

(Continued)

*Primary Examiner* — Jeffery Williams
(74) *Attorney, Agent, or Firm* — Honigman Miller Schwartz and Cohn, LLP

(57) ABSTRACT

A method for displaying video images includes providing a control having an image processor operable to process image data captured by cameras of a vehicular multi-camera vision system, and disposing a display device in the vehicle that is viewable by a driver of the vehicle, with the display device having a video display screen that displays video images derived at least in part from image data captured by at least one of the cameras. A display intensity of video images displayed by the video display screen is controlled and, responsive to determination of a reduction in exterior ambient light level within the field of view of the at least one of the cameras, the display intensity of video images displayed by the video display screen is held to within 15 percent of the display intensity that was displayed before the determination of the reduction in exterior ambient light level.

20 Claims, 22 Drawing Sheets

(56) References Cited

U.S. PATENT DOCUMENTS

| | | | |
|---|---|---|---|
| 7,338,177 B2 | 3/2008 | Lynam | |
| 7,370,983 B2 | 5/2008 | De Wind et al. | |
| 7,375,803 B1 | 5/2008 | Bamji | |
| 7,446,650 B2 | 11/2008 | Schofield et al. | |
| 7,581,859 B2 | 9/2009 | Lynam | |
| 7,626,749 B2 | 12/2009 | Baur et al. | |
| 7,720,580 B2 | 5/2010 | Higgins-Luthman | |
| 7,855,755 B2 | 12/2010 | Weller et al. | |
| 8,446,470 B2 | 5/2013 | Lu et al. | |
| 9,041,806 B2 | 5/2015 | Baur et al. | |
| 9,126,525 B2 | 9/2015 | Lynam et al. | |
| 9,264,672 B2 | 2/2016 | Lynam | |
| 9,800,794 B2 | 10/2017 | Weber | |
| 9,912,876 B1 | 3/2018 | Weber | |
| 2003/0103141 A1* | 6/2003 | Bechtel | G07C 5/0891 348/148 |
| 2006/0050018 A1 | 3/2006 | Hutzel et al. | |
| 2006/0061008 A1 | 3/2006 | Karner et al. | |
| 2006/0164533 A1 | 7/2006 | Hsieh | |
| 2011/0292241 A1 | 12/2011 | Segapelli | |
| 2013/0250114 A1 | 9/2013 | Lu | |
| 2014/0160284 A1 | 6/2014 | Achenbach et al. | |
| 2014/0333729 A1 | 11/2014 | Pflug | |
| 2014/0340510 A1 | 11/2014 | Ihlenburg | |
| 2015/0022664 A1 | 1/2015 | Pflug et al. | |
| 2015/0049193 A1 | 2/2015 | Gupta et al. | |

\* cited by examiner

VEHICLE VISION SYSTEM WITH ENHANCED LOW LIGHT CAPABILITIES

CROSS REFERENCE TO RELATED APPLICATIONS

The present application is a continuation of U.S. patent application Ser. No. 15/790,174, filed Oct. 23, 2017, now U.S. Pat. No. 9,912,876, which is a continuation of U.S. patent application Ser. No. 14/290,028, filed May 29, 2014, now U.S. Pat. No. 9,800,794, which claims the filing benefits of U.S. provisional application Ser. No. 61/830,375, filed Jun. 3, 2013, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a vision system or imaging system for a vehicle that utilizes one or more cameras (preferably one or more CMOS cameras) to capture image data representative of images exterior of the vehicle, and provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle, such as when the vehicle is backing up. The vision system may be operable to display a surround view or bird's eye view of the environment at or around or at least partially surrounding the subject or equipped vehicle, and the displayed image may include a displayed image representation of the subject vehicle. The present invention also provides enhanced low light vision capabilities to enhance detection of objects in low light conditions. The system may adjust one or more parameters, such as exposure period and/or frame rate to provide enhanced camera vision or machine vision in low lighting conditions, while providing a generally constant display output or the like.

According to an aspect of the present invention, a vision system of a vehicle includes a camera and a control. The camera is disposed at a vehicle and has a field of view exterior of the vehicle, such as rearwardly of the vehicle or forwardly of the vehicle. The camera includes a pixelated imaging array having a plurality of photosensing elements. The control has an image processor operable to process image data captured by the camera. Responsive to a determination of a reduced ambient light level or reduction in ambient light level at the imaged scene, the control is operable to adjust at least one of (i) an exposure time for image capture by the camera and (ii) a frame rate of image capture by the camera. Optionally, for example, responsive to a determination of a reduction in ambient light level at the imaged scene, the control may adjust the exposure time to a longer exposure time and may adjust the frame rate to a slower frame rate.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Figure 1:
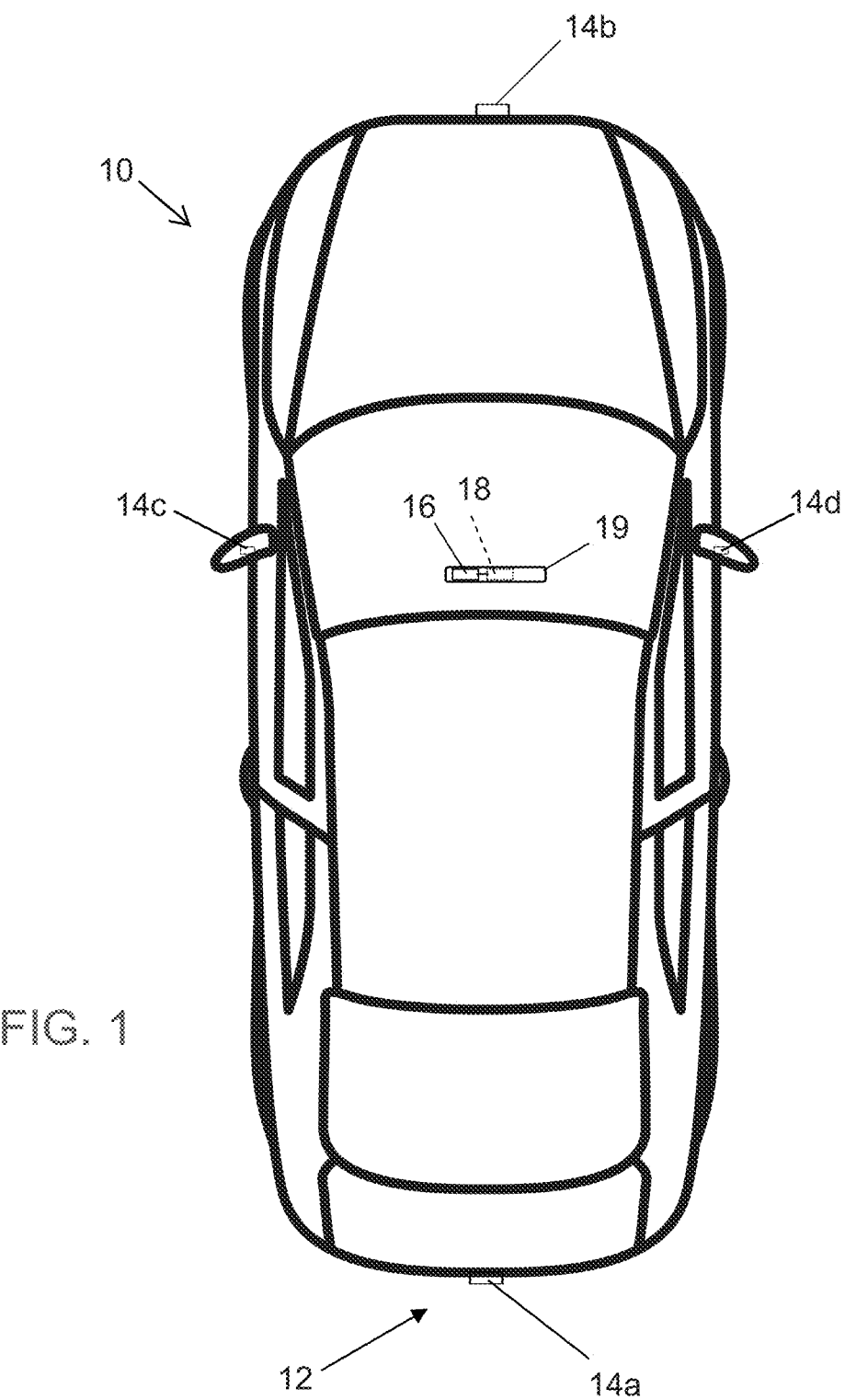
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 19 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
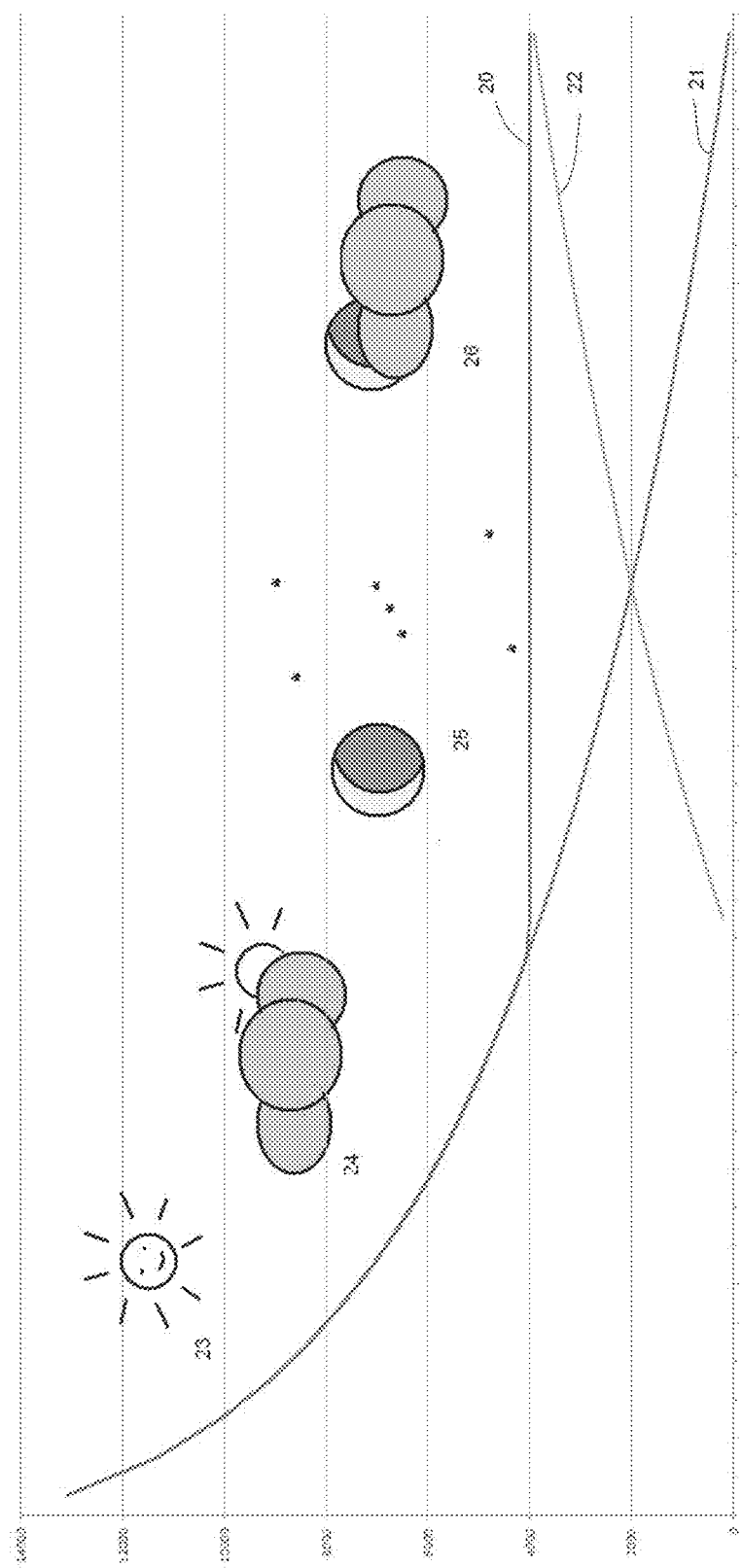
FIG. 2 is a graph showing various lighting conditions and the gain adjustment to achieve a relatively constant illumination reproduction as the lighting conditions darken.

As shown in FIG. 2, curve 21 represents real world lighting/illumination conditions. The human eye is very capable in adapting to lighting conditions. Outside at summer daylight the illumination is different than at night having, for example, one candle as illumination. The human eye can perceive at both conditions.

Electronically cameras have a limited illumination perception or perceivability range, especially in dark or low lighting conditions where the perceivability of the electronic photosensing pixels of the camera is at its borderline or threshold limits of operation. To make cameras see (at least something) also in darkness, the incoming light has to be collected physically, especially optically with enhanced lenses or electronically via image processing of captured image data. The camera can either collect more photons on the pixels by lengthening the exposure time or by further amplifying the signals of the pixels. Theoretically, the signal amplification (analog and digital gain) and exposure time is interchangeable. However, by increasing the amplification, the pixel noise also becomes amplified, which is why amplifying should be limited or avoided.

By extending the exposure time, the captured images motion blurring increases. The cameras algorithms are capable to compensate the motion blurring to a certain extent (motion compensation). The exposure time cannot exceed the time distance between two frames. The time distance between two frames plus some overhead is the natural limit to which the exposure time may be extended for collecting more light (such as for countering on low environmental light conditions). When cutting or reducing the number of frames taken within a second by about half, such as, for example, from 30 fps to 15 fps, the exposure time may be doubled. Thus, the night view capability can be doubled under the cost of increased motion blurring and increased pixel noise when turning the amplification (gain) to maximum.

As shown in FIG. 2, curve 22 is the overall amplification (analog gain, digital gain, exposure time), and curve 20 is the illumination reproduction on a target system. The target may comprise a machine vision system (having an image processor that processes image data captured by the camera) or a display (that displays images derived from images or image data captured by the camera). It is assumed here that 4000 may be the lowest borderline at which a scene is conceivable on the display. Above 4000, the display reproduces the captured illumination level truly (1:1), but when the captured illumination drops under 4000, the target system starts to add (gain) to the truly captured illumination level (this is done by the camera and not by the display, since the camera knows the minimum output level by parameter). The distance between 20 and 21 is closed by the factor of 22. In FIG. 2, the various lighting conditions are shown as bright sunlight conditions 23, with a strong source illumination (natural illumination in front of the camera), daylight cloudy conditions 24, with a high source illumination, dark conditions 25, such as like at moonlight or street lamp light, with low source illumination, and very dark conditions 26, such as a cloudy night, with very low source illumination.

The present invention provides a light control algorithm with improved low light performance, and the algorithm may achieve this via reducing the frame rate, such as from the typical 30 frames per second to about 15 frames per second, for example. The aim of the loop control of the algorithm is to keep the displayed illumination at a constant medium level (so it is not too bright and not too dark) when the source illumination is more and more reducing or diminishing. The present invention utilizes or adjusts the frame rate (so that the frame rate is a variable) to enhance collection of more light in reduced lighting conditions.

Figure 4:
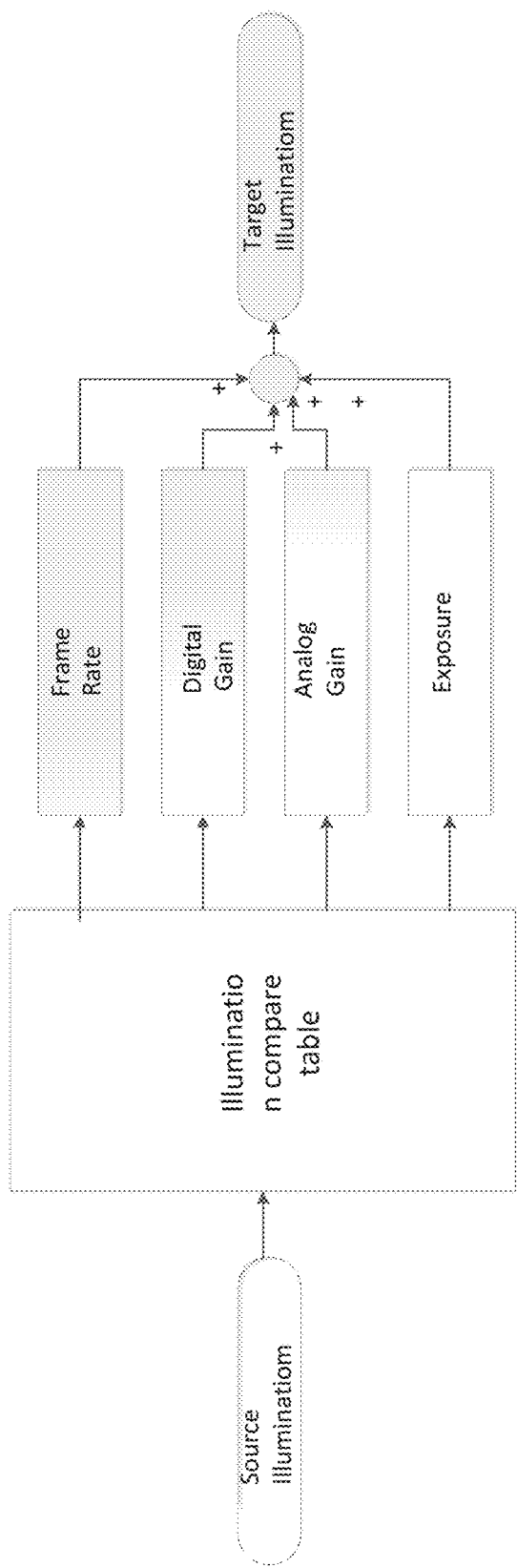
FIG. 4 is a block diagram of the system of the present invention, showing the system utilizing a look up table to determine the appropriate adjustments in response to a determined or detected source illumination.
Figure 5:
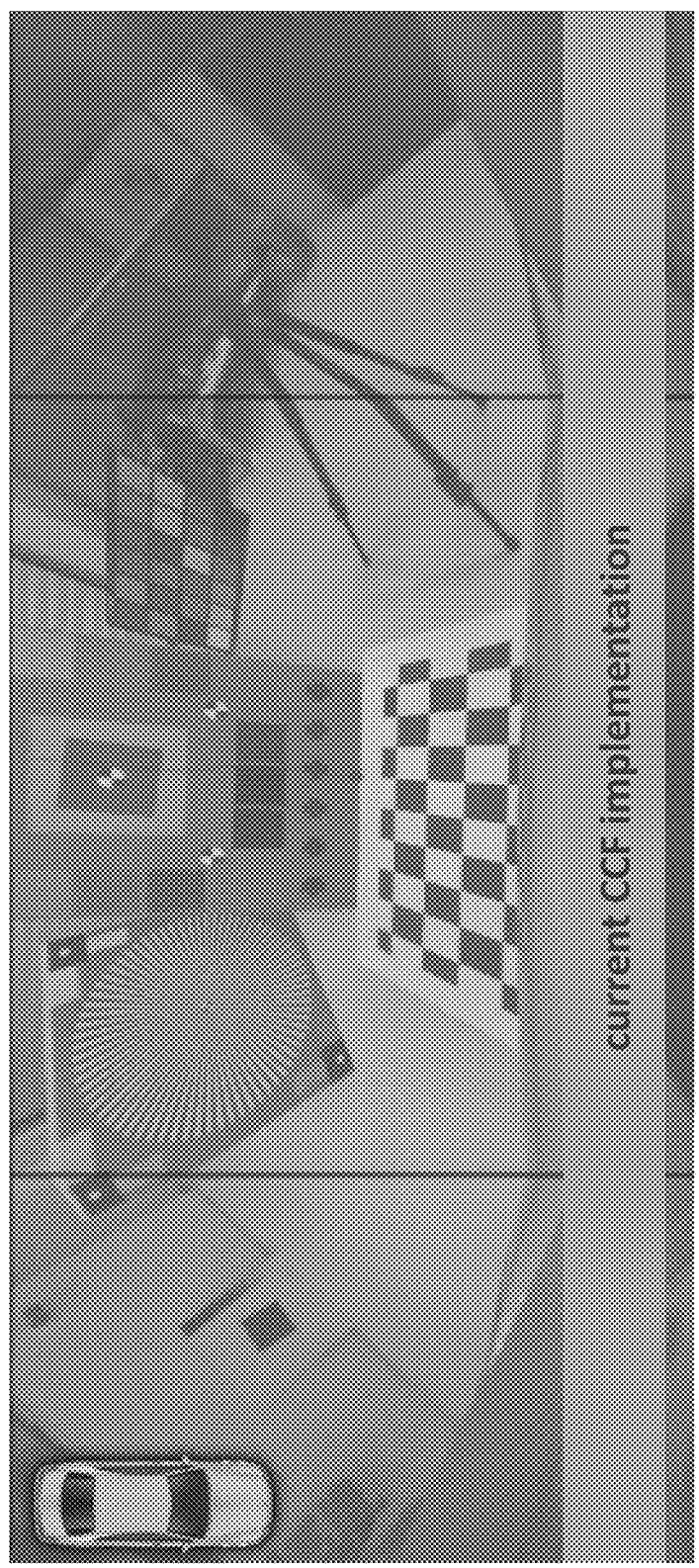
FIGS. 5-16 are images showing lab testing of the vision system of the present invention in various lighting conditions.
Figure 6:
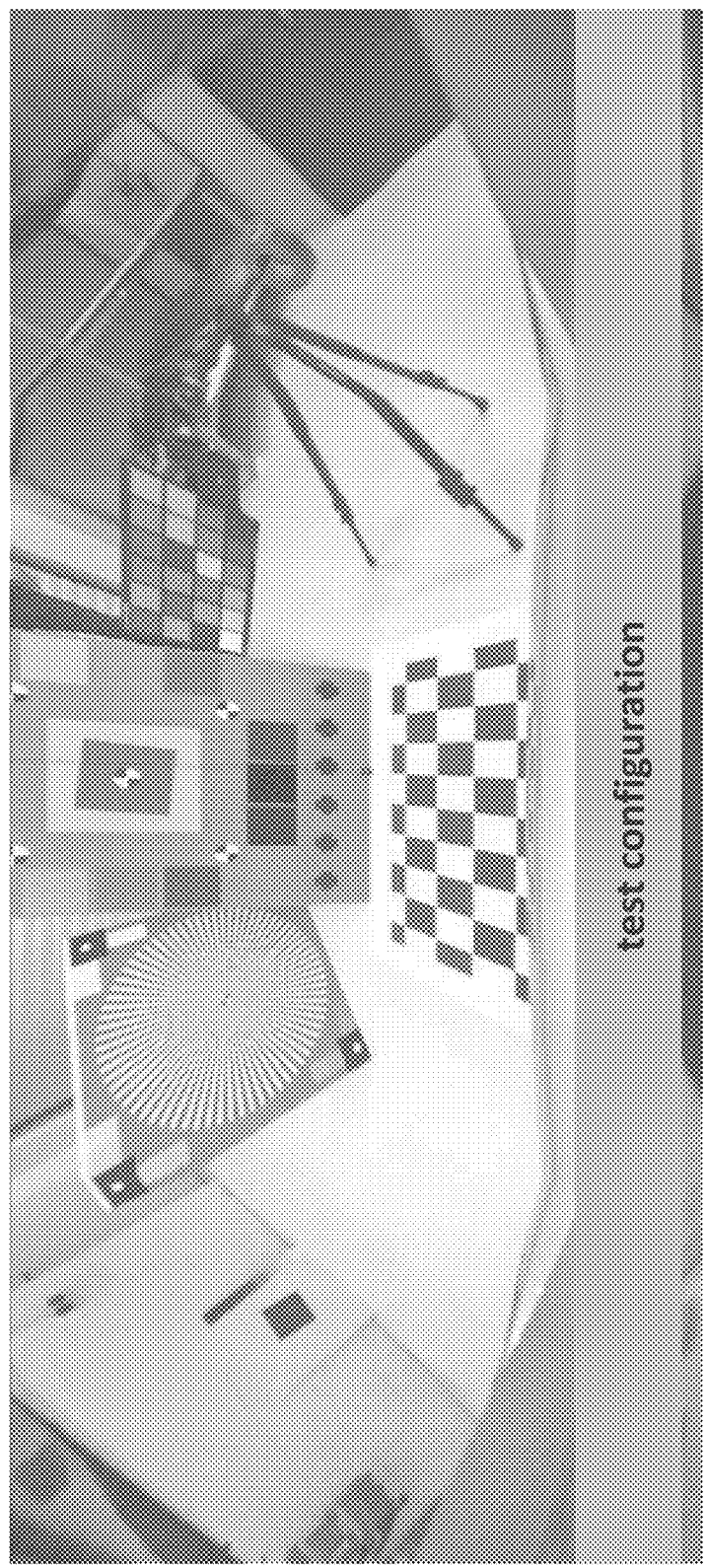
Figure 7:
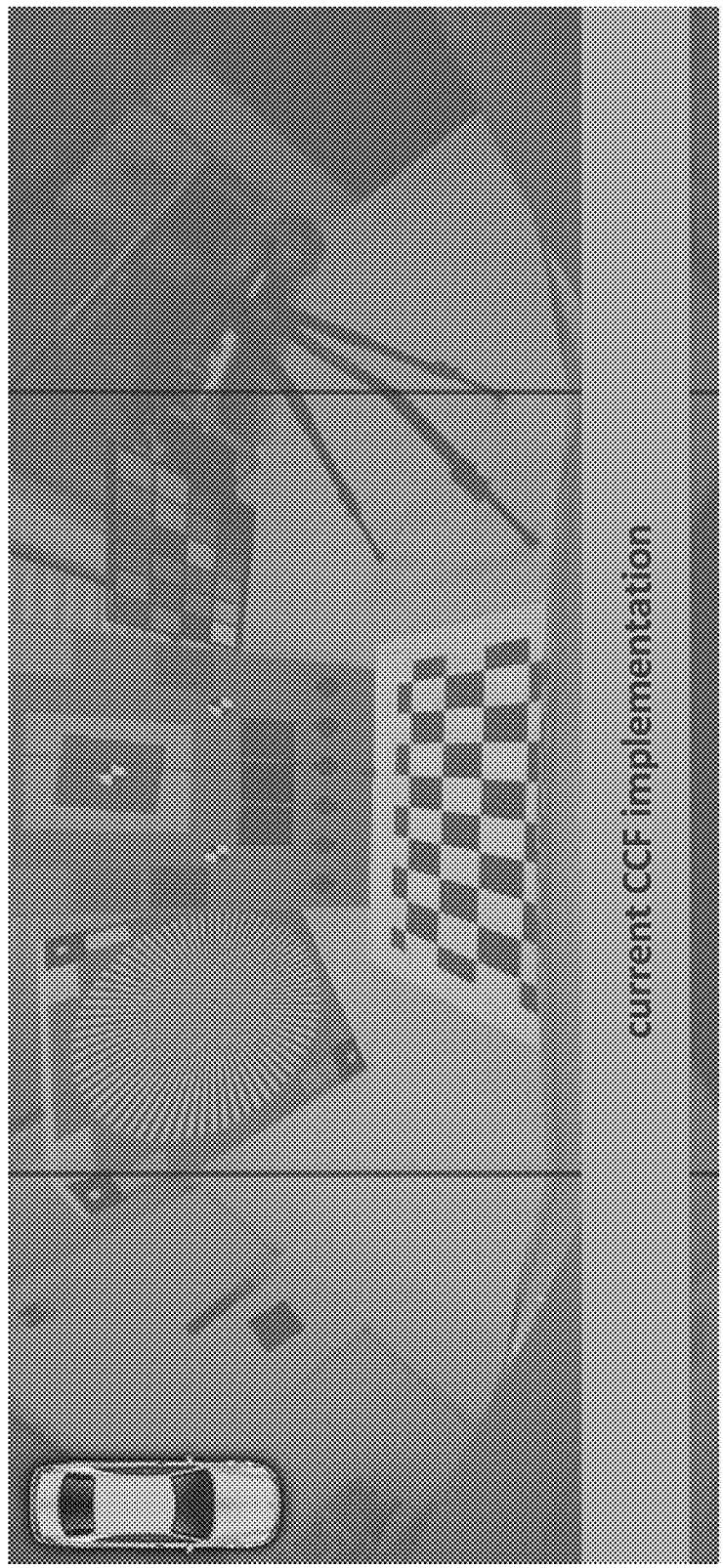
Figure 8:
Figure 9:
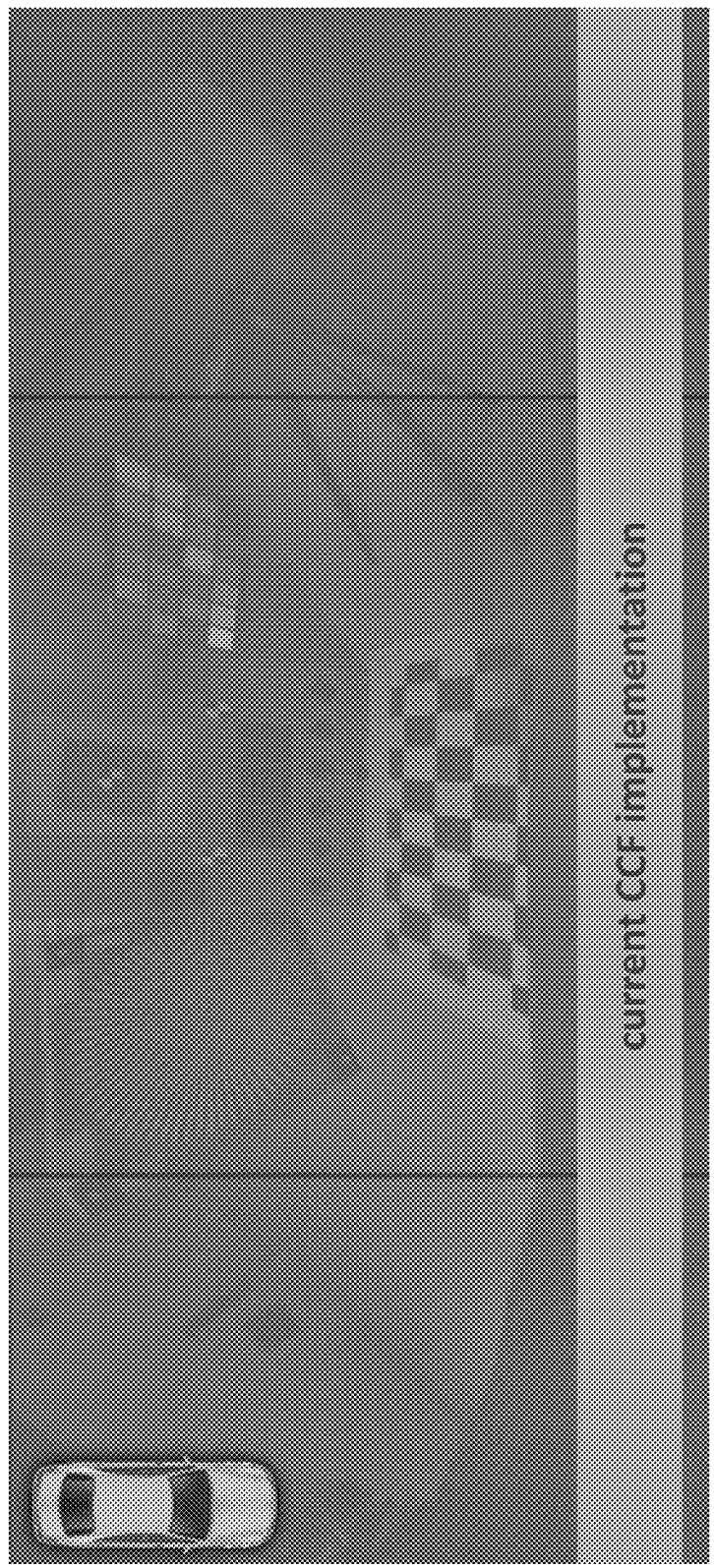
Figure 10:
Figure 11:
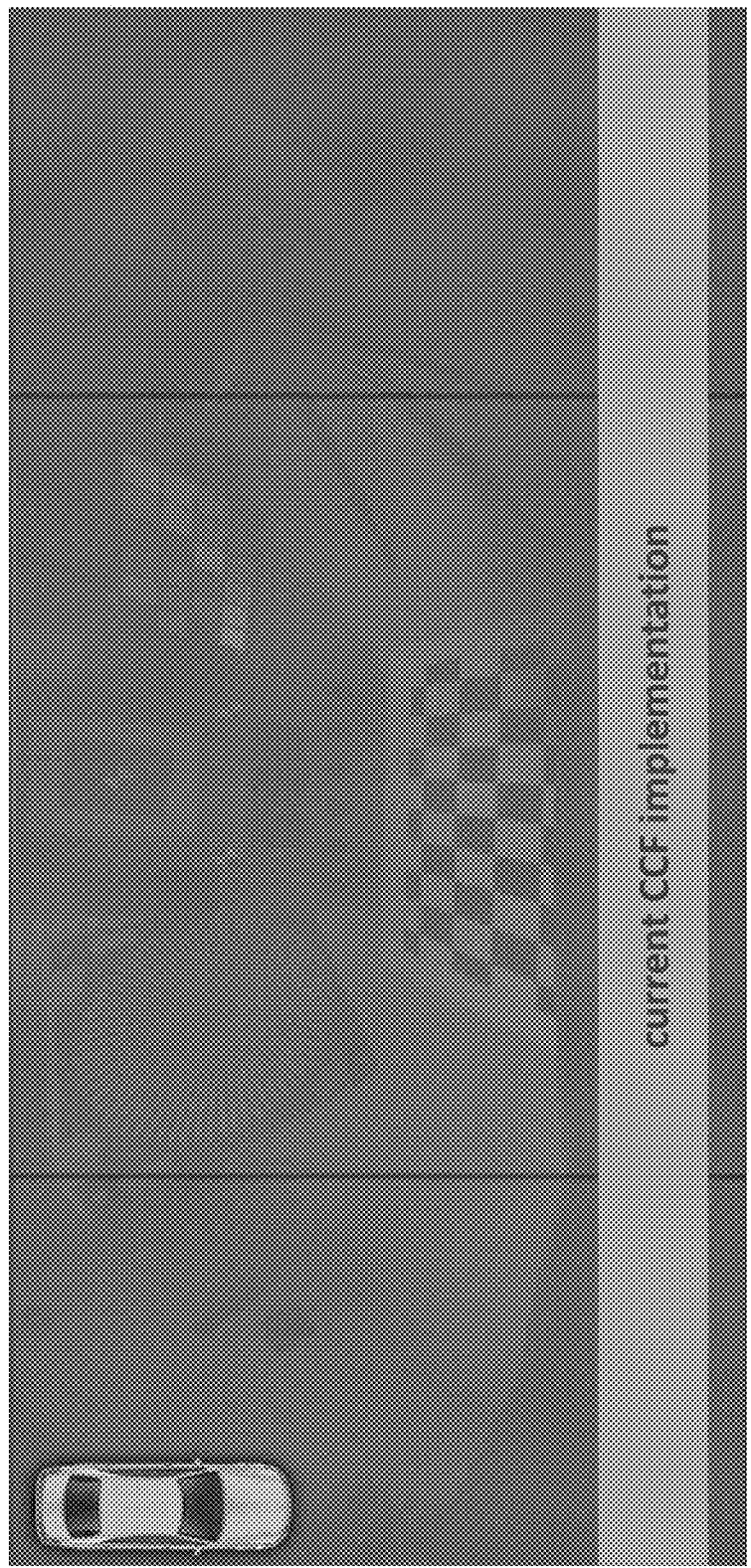
Figure 12:
Figure 13:
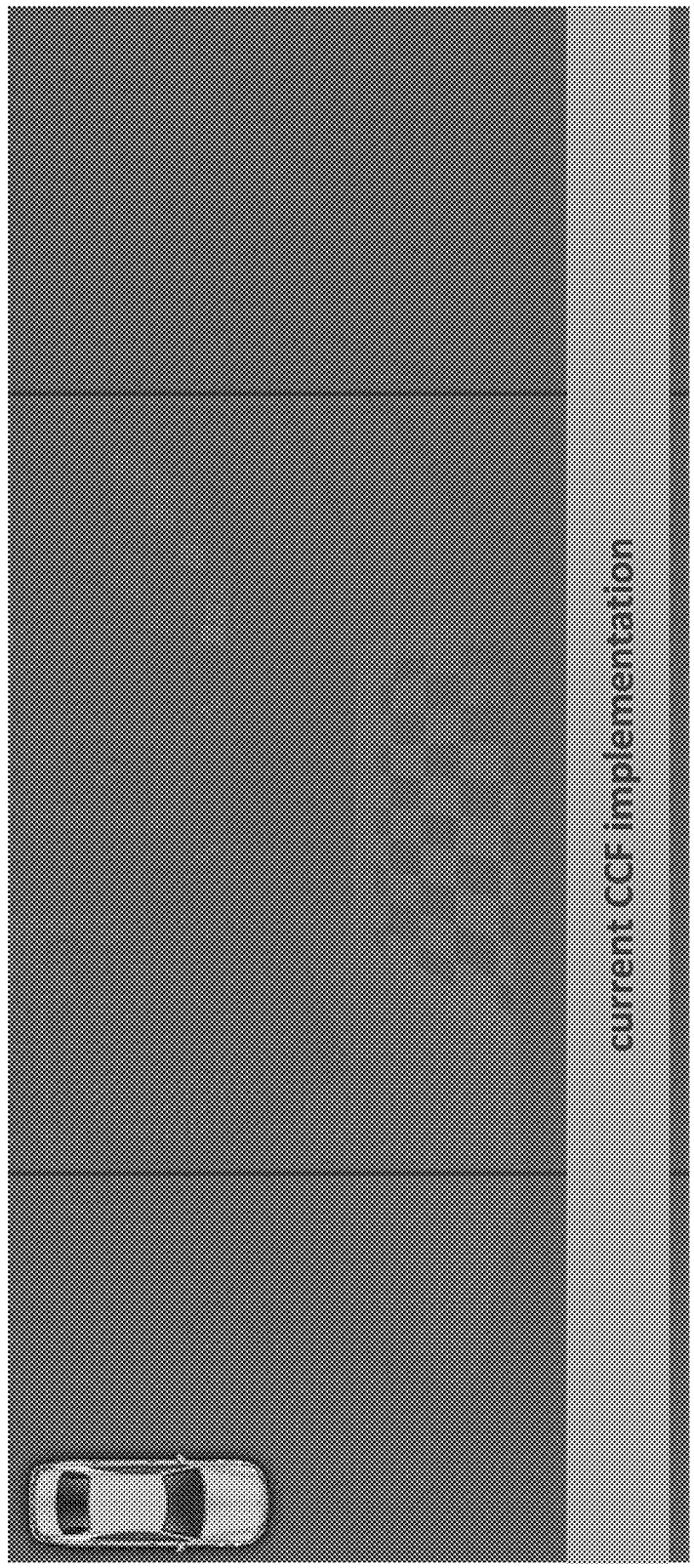
Figure 14:
Figure 15:
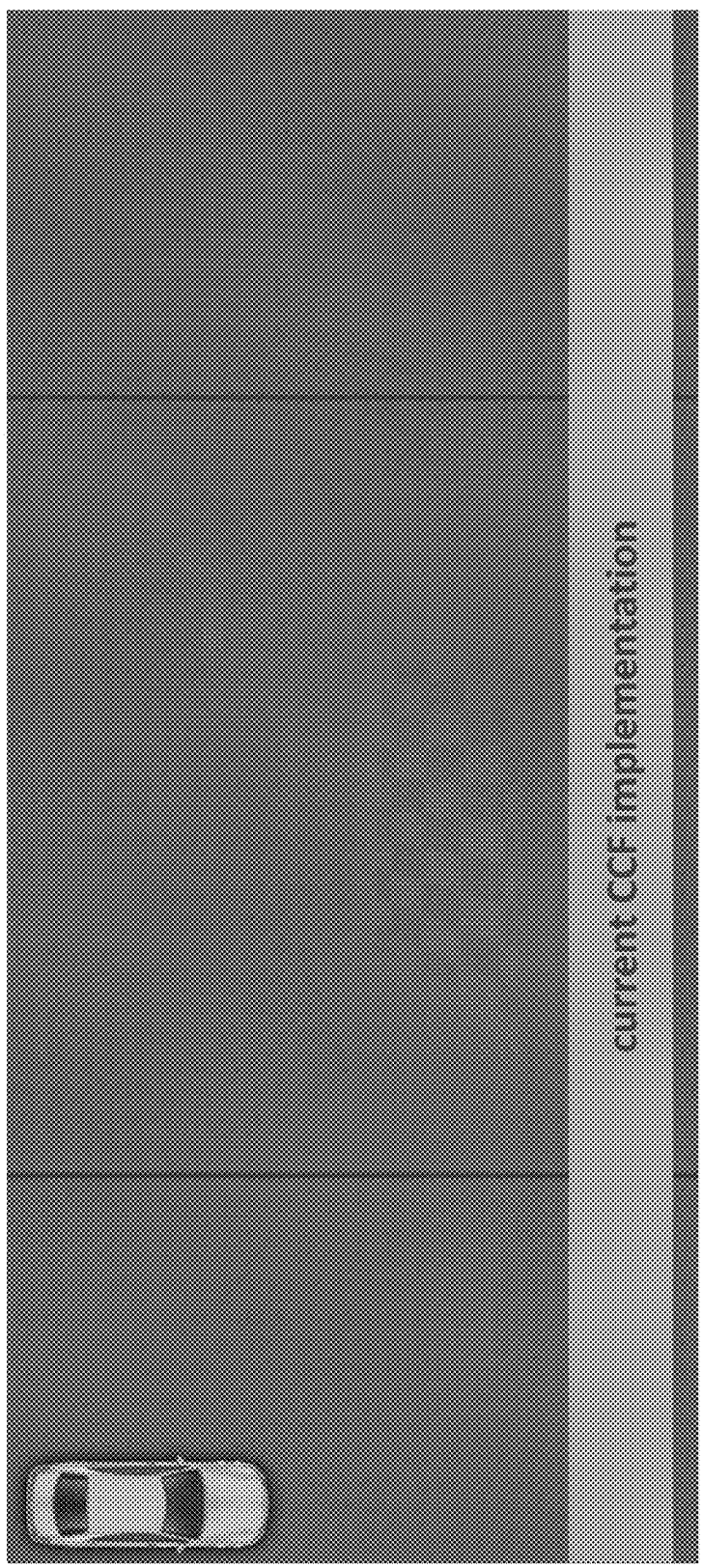
Figure 16:
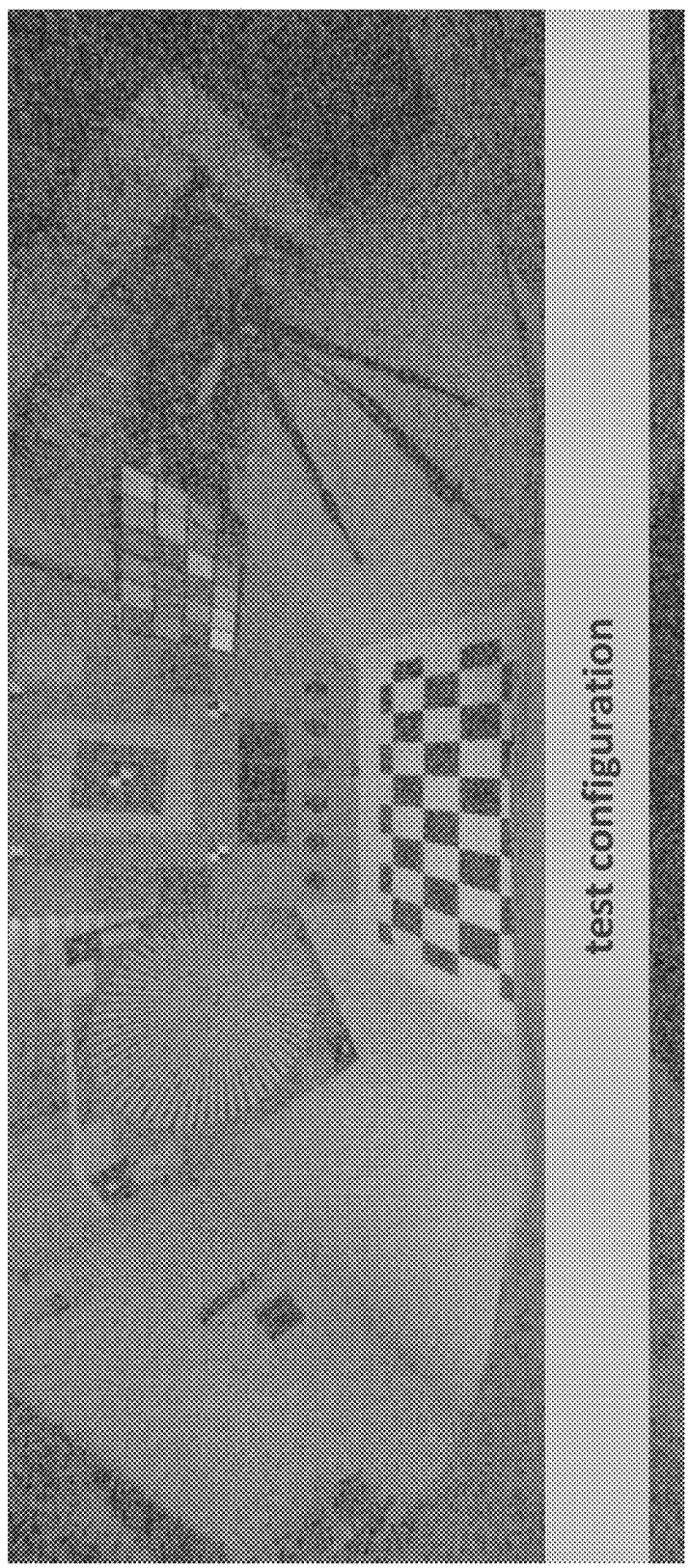

As shown in FIG. 4, the system has four variables to control the illumination:
Frame rate (30 frames/sec, 15 frames/sec, . . . ) f
Digital gain ($\frac{1}{32}$, $\frac{1}{64}$, . . . ) d
Analog gain (×1, ×2, ×4, ×8, . . . ) a
Exposure (time expressed in n lines) e The illumination level is a product of all four factors (f, d, a and e). When one changes, one or more others of the factors have to counter change to keep the illumination level or brightness constant or substantially constant.

Figure 3:
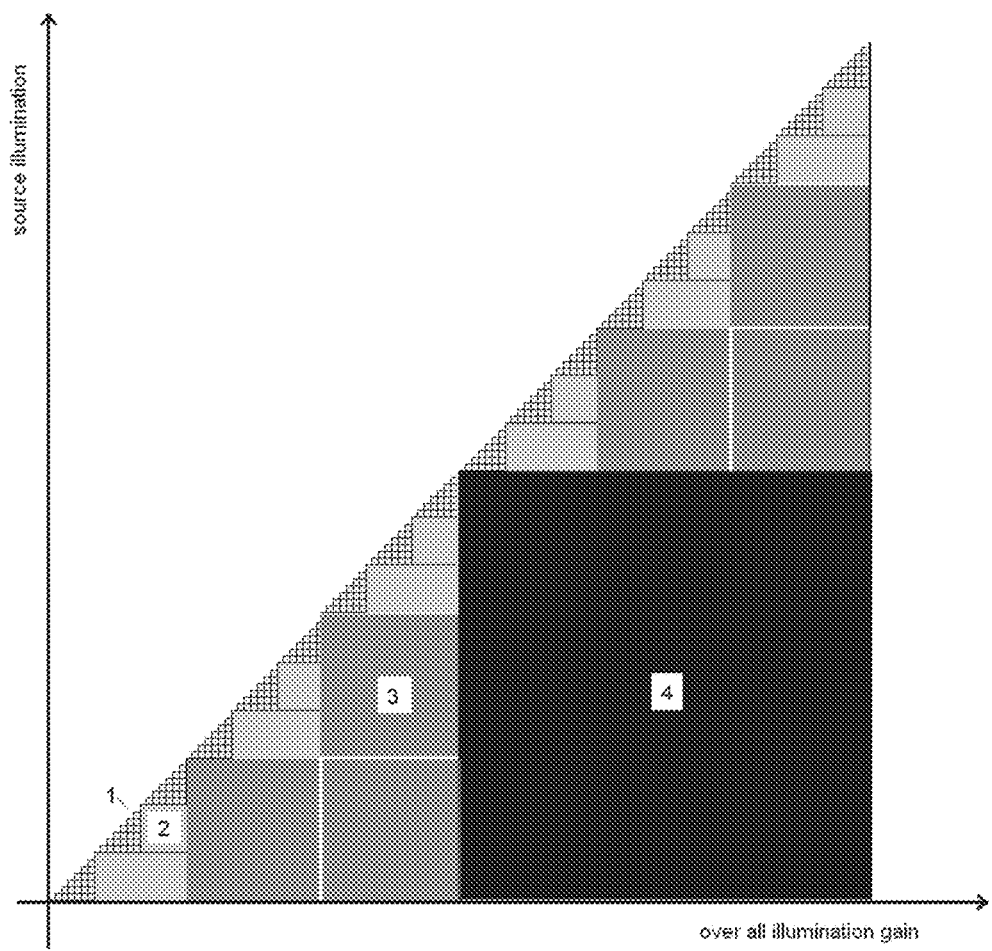
FIG. 3 is a graph showing the relationship between source illumination and the overall illumination gain of the system of the present invention.

When the illumination of a to-be-captured scene is diminishing, the exposure time may be controlled longer. The exposure time is maximumly limited to the time one frame takes (or fractions of one frame in the case of using high definition resolution (HDR) imagers, which may take short and long frames consecutively (such as done by imagers commercially available from Aptina of San Jose, Calif.) or at the same time (such as done by imagers commercially available from Omnivision Technologies of Santa Clara, Calif.)). When the exposure time is at its longest end, the gain will have to be increased. With the gain increase, the noise level also increases. This is why exposure adjustment or control is preferred. Because the digital gain is more rough, the analog gain may be tuned first before the digital. When the gain end exposure is on its end due to further diminished lighting conditions, the frame rate may be shifted or adjusted, such as from 30 fps to 15 frames per second, which enables the exposure to be longer (such as about double) since every frame lasts longer. As can be seen in FIG. 3, when the frame rate is adjusted or switched the other values have to be switched off (or reduced).

The present invention preferably provides the adjustments or switches without causing brightness flicker or long term waves. The system's control may employ an index value pre control rather than waiting for the illumination error to be fed back to the input. Because the number of control states is limited to e×a×d×f and some behaviors in illumination are not fully linear and by that not easy to express mathematically, a look up table containing all illumination to control state relations may come into use in practice. It's a relation because often different combinations may be possible to use for achieving one desired overall gain factor.

Figure 17:
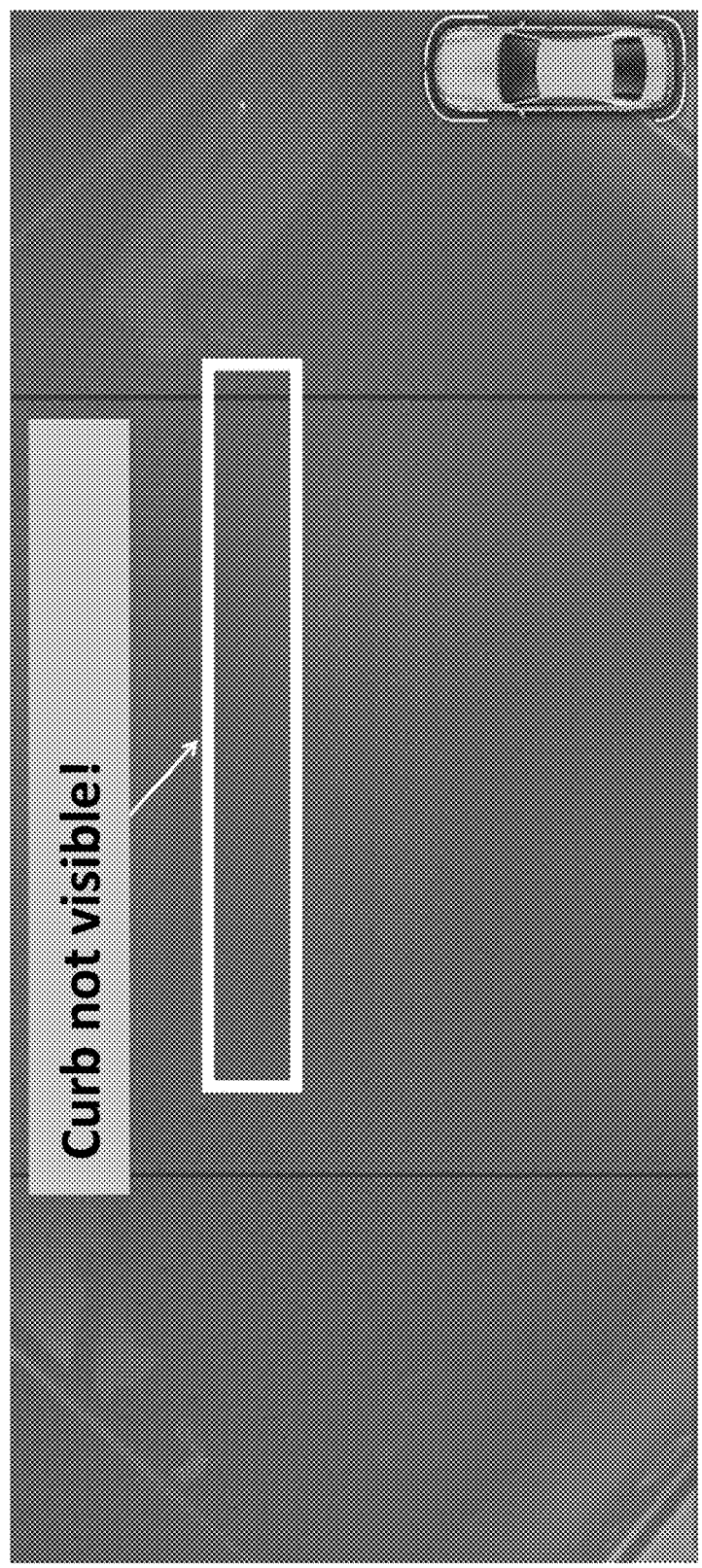
FIGS. 17-22 are images showing actual vehicle testing of the present invention in various lighting conditions.
Figure 18:
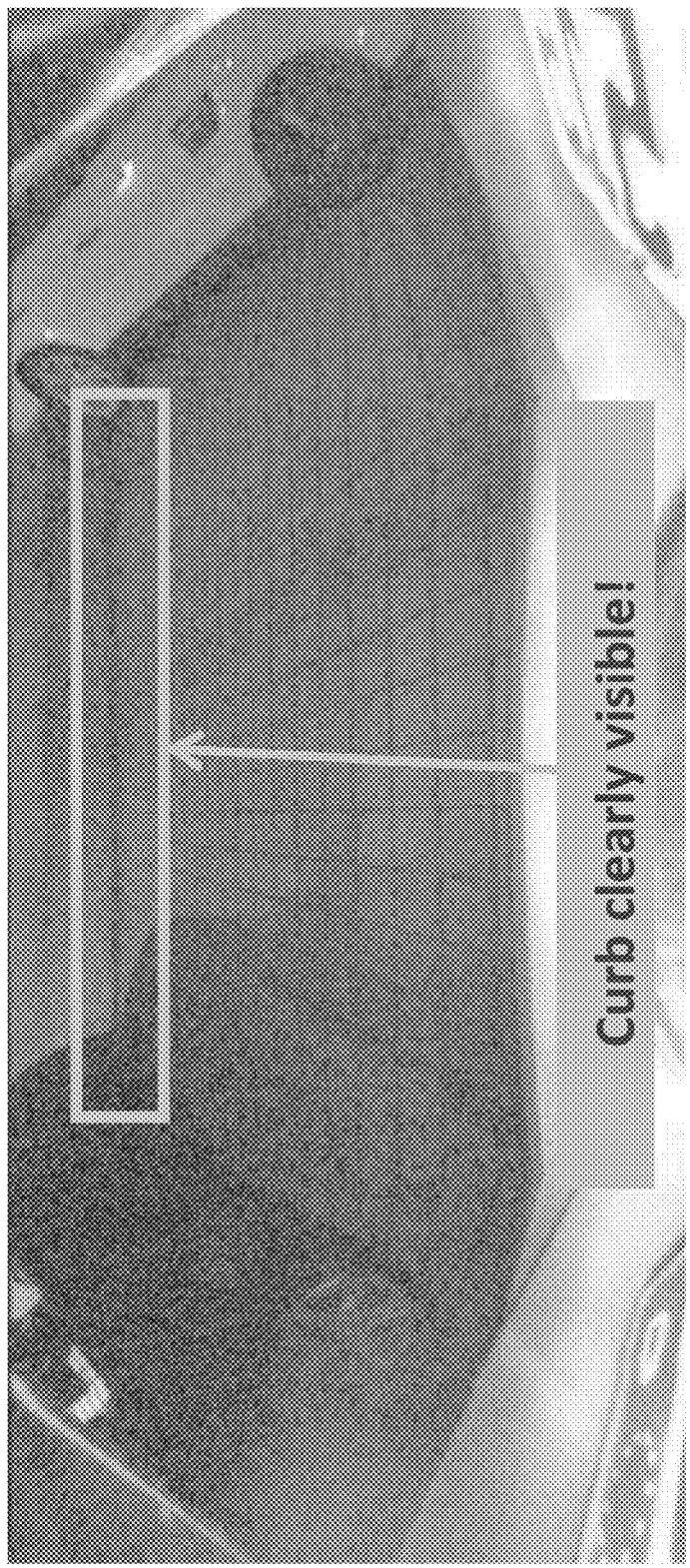
Figure 19:
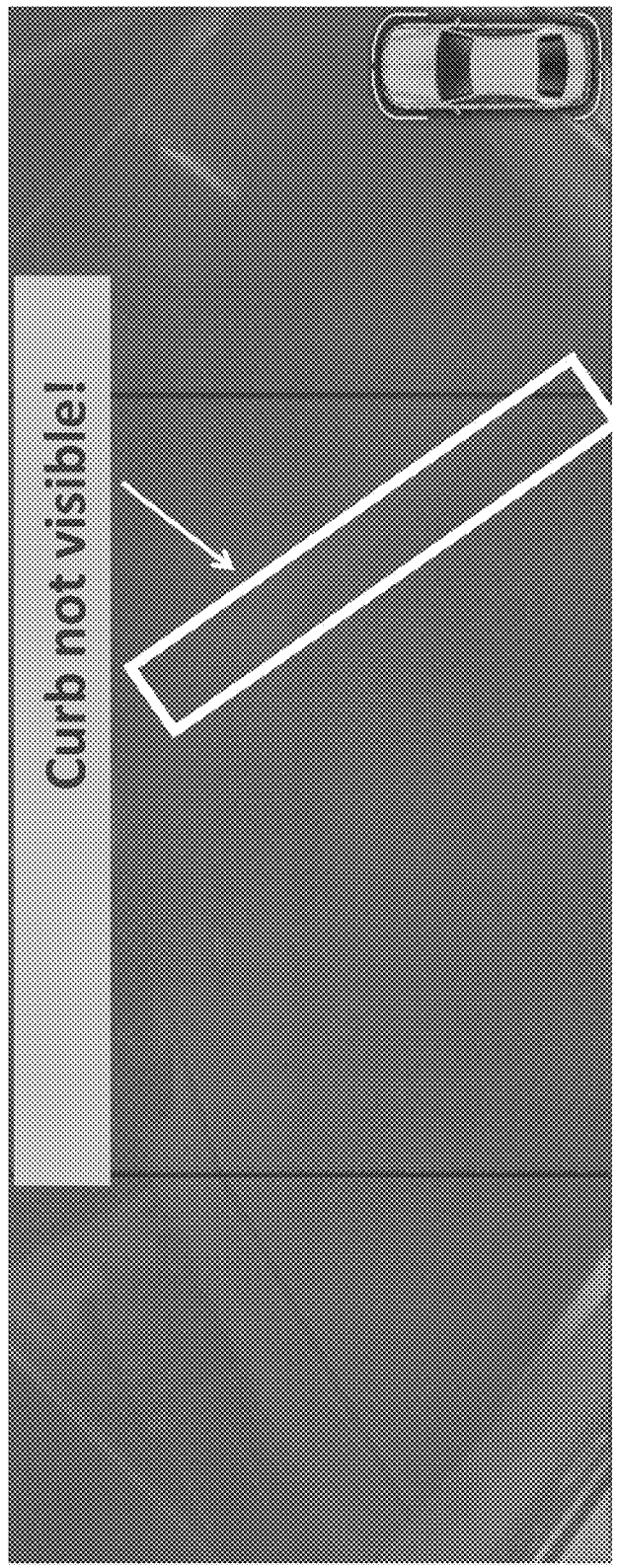
Figure 20:
Figure 21:
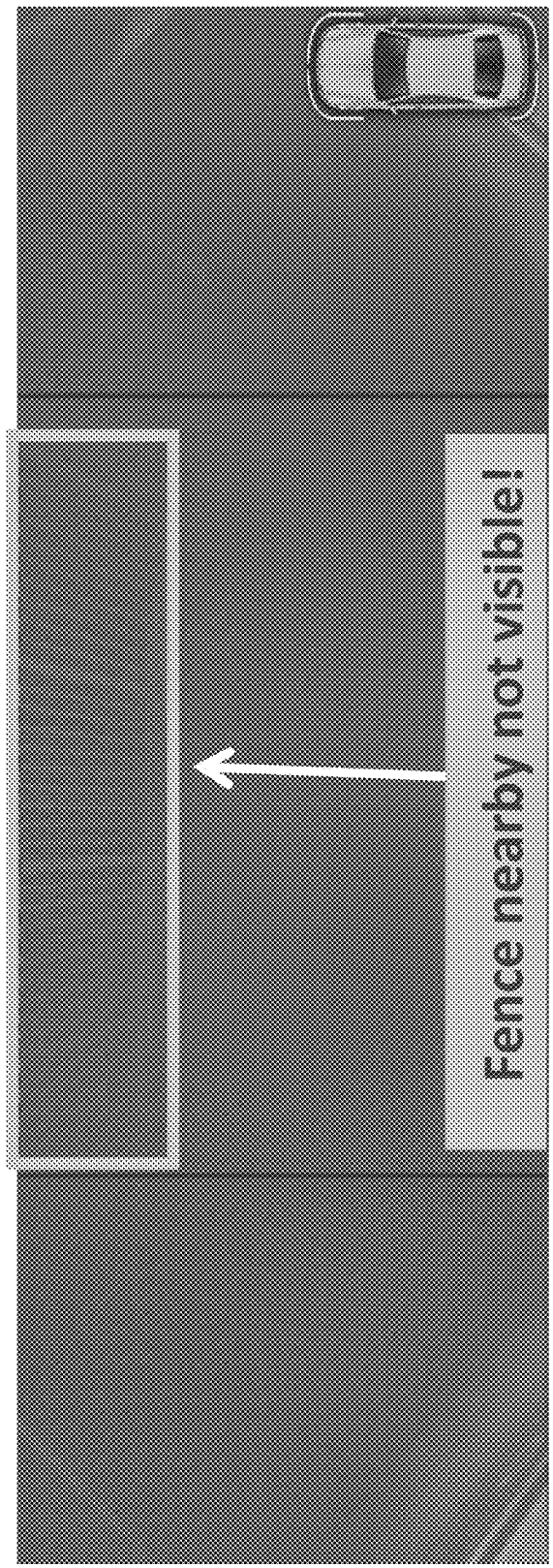
Figure 22:
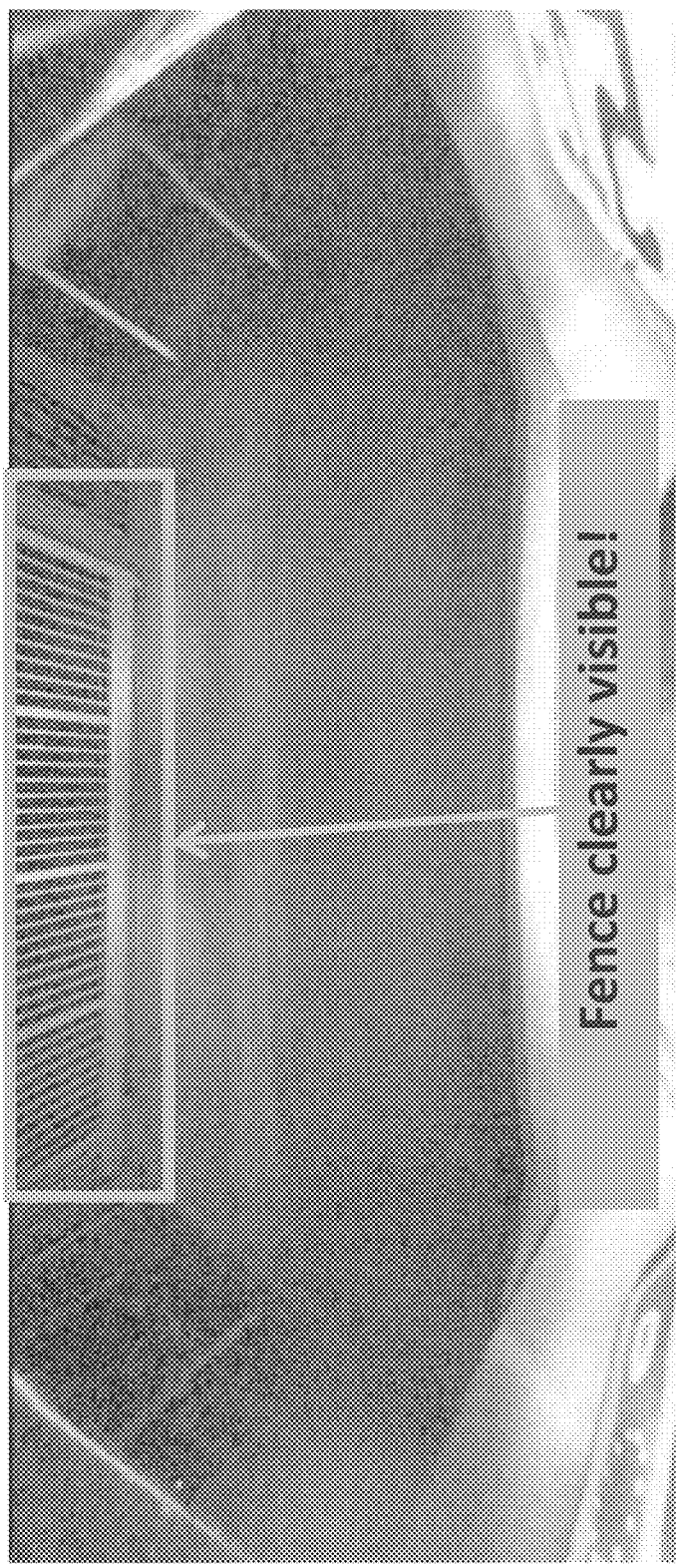

Thus, the present invention provides a vision system with enhanced performance in low lighting conditions. The system may control or adjust the frame rate of image capture of the camera or cameras to enable longer exposure times, such as by reducing the frame rate from around 30 fps to about 15 fps. The system may decouple the color and luminance processing to improve detail visibility. FIGS. 5-16 illustrate lab testing of the vision system of the present invention in various lighting conditions, with FIGS. 5, 7, 9, 11, 13 and 15 showing the captured images when captured under normal or conventional image capture means, while FIGS. 6, 8, 10, 12, 14 and 16 show the captured images when the frame rate and/or other parameters are adjusted in accordance with the present invention. FIGS. 17-22 illustrate actual vehicle testing of the present invention in various lighting conditions, with FIGS. 17, 19 and 21 showing the captured images when captured under normal or conventional image capture means, while FIGS. 18, 20 and 22 show the captured images when the frame rate and/or other parameters are adjusted in accordance with the present invention. As can be seen with reference to FIGS. 5-22, the present invention substantially improves scene visibility in low lighting conditions. The system may also utilize an algorithm that reduces noise for non-moving objects in the scene encompassed by the camera.

In accordance with the present invention, the display illumination level (i.e., the display intensity) of displayed video images (commonly expressed in candelas per square meter), as viewed by the driver who is viewing the in-cabin video display screen, remains constant when, for example, the rear backup camera or other vehicular camera is operated during nighttime ambient lighting conditions, irrespective of the ambient light level present during a particular reversing/driving maneuver. Thus, for example, the illumination level/display intensity of the displayed video images as seen by the driver who is reversing or driving the vehicle in a dark, rural environment, where ambient lighting may be low (for example, less than about five lux or less than about one lux or lower) may be consistent with displayed video images as seen by the driver when the driver is reversing or driving the vehicle in an urban environment, where in addition to moonlight, area lighting from the likes of street lights and other lights may be present that adds to the ambient light at the vehicle. For example, the display intensity may have a nominal or operating intensity of around or greater than about 200 candelas per square meter, and the display intensity may be consistently held within, for example, about 15 percent of its nominal or operating display intensity, or preferably within about 10 percent of its nominal or operating display intensity or within about 5 percent of its nominal or operating display intensity, irrespective of changes in the ambient lighting level at or around the vehicle. The present invention thus provides consistency and uniformity of display image intensity as viewed by the driver when driving/reversing the vehicle under dark nighttime rural ambient lighting conditions or when driving/reversing the vehicle under city or urban street lit higher ambient lighting conditions. In accordance with the present invention, this is achieved without deterioration of the displayed and viewed video images, such as may otherwise occur when video noise is introduced such as via utilization of gain-based video signal amplification.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/116043; WO 2012/145313; WO 2012/145501; WO 2012/145818; WO 2012/145822; WO 2012/158167; WO 2012/075250; WO 2012/116043; WO 2012/145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent application Ser. No. 14/268,169, filed May 2, 2014, and published Nov. 6, 2014 as U.S. Publication No. US-2014-032772; Ser. No. 14/264,443, filed Apr. 29, 2014, and published Oct. 30, 2014 as U.S. Publication No. US-2014-0320636; Ser. No. 14/354,675, filed Apr. 28, 2014, now U.S. Pat. No. 9,580,013; Ser. No. 14/248,602, filed Apr. 9, 2014, now U.S. Pat. No. 9,327,693; Ser. No. 14/242,038, filed Apr. 1, 2014, now U.S. Pat. No. 9,487,159; Ser. No. 14/229,061, filed Mar. 28, 2014, and published Oct. 2, 2014 as U.S. Publication No. US-2014-0293042; Ser. No. 14/343,937, filed Mar. 10, 2014, now U.S. Pat. No. 9,681,062; Ser. No. 14/343,936, filed Mar. 10, 2014, and published Aug. 7, 2014 as U.S. Publication No. US-2014-0218535; Ser. No. 14/195,135, filed Mar. 3, 2014, now U.S. Pat. No. 9,688,200; Ser. No. 14/195,136, filed Mar. 3, 2014, and published Sep. 4, 2014 as U.S. Publication No. US-2014-0247355; Ser. No. 14/191,512, filed Feb. 27, 2014, and published Sep. 4, 2014 as U.S. Publication No. US-2014-0247352; Ser. No. 14/183,613, filed Feb. 19, 2014, now U.S. Pat. No. 9,445,057; Ser. No. 14/169,329, filed Jan. 31, 2014, and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014, and published Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013, now U.S. Pat. No. 9,558,409; Ser. No. 14/102,980, filed Dec. 11, 2013, and published Jun. 19, 2014 as U.S. Publication No. US-2014-0168437; Ser. No. 14/098,817, filed Dec. 6, 2013, and published Jun. 19, 2014 as U.S. Publication No. US-2014-0168415; Ser. No. 14/097,581, filed Dec. 5, 2013, now U.S. Pat. No. 9,481,301; Ser. No. 14/093,981, filed Dec. 2, 2013, now U.S. Pat. No. 8,917,169; Ser. No. 14/093,980, filed Dec. 2, 2013, and published Jun. 5, 2014 as U.S. Publication No. US-2014-0152825; Ser. No. 14/082,573, filed Nov. 18, 2013, now U.S. Pat. No. 9,743,002; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013, now U.S. Pat. No. 9,707,896; Ser. No. 14/046,174, filed Oct. 4, 2013, now U.S. Pat. No. 9,723,272; Ser. No. 14/016,790, filed Oct. 3, 2013, now U.S. Pat. No. 9,761,142; Ser. No. 14/036,723, filed Sep. 25, 2013, now U.S. Pat. No. 9,446,713; Ser. No. 14/016,790, filed Sep. 3, 2013, now U.S. Pat. No. 9,761,142; Ser. No. 14/001,272, filed Aug. 23, 2013, now U.S. Pat. No. 9,233,641; Ser. No. 13/970,868, filed Aug. 20, 2013, now U.S. Pat. No. 9,365,162; Ser. No. 13/964,134, filed Aug. 12, 2013, now U.S. Pat. No. 9,340,227; Ser. No. 13/942,758, filed Jul. 16, 2013, and published on Jan. 23, 2014 as U.S. Publication No. US-2014-0025240; Ser. No. 13/942,753, filed Jul. 16, 2013, and published Jan. 30, 2014 as U.S. Publication No. US-2014-0028852; Ser. No. 13/927,680, filed Jun. 26, 2013, and published Jan. 2, 2014 as U.S. Publication No. US-2014-0005907; Ser. No. 13/916,051, filed Jun. 12, 2013, now U.S. Pat. No. 9,077,098; Ser. No. 13/894,870, filed May 15, 2013, and published Nov. 28, 2013 as U.S. Publication No. US-2013-0314503; Ser. No. 13/887,724, filed May 6, 2013, now U.S. Pat. No. 9,670,895; Ser. No. 13/852,190, filed Mar. 28, 2013, and published Aug. 29, 2013 as U.S. Patent Publication No. US-2013/0222593; Ser. No. 13/851,378, filed Mar. 27, 2013, now U.S. Pat. No. 9,319,637; Ser. No. 13/848,796, filed Mar. 22, 2012, and published Oct. 24, 2013 as U.S. Publication No. US-2013-0278769; Ser. No. 13/847,815, filed Mar. 20, 2013, and published Oct. 31, 2013 as U.S. Publication No. US-2013-0286193; Ser. No. 13/800,697, filed Mar. 13, 2013, and published Oct. 3, 2013 as U.S. Publication No. US-2013-0258077; Ser. No. 13/785,099, filed Mar. 5, 2013, now U.S. Pat. No. 9,565,342; Ser. No. 13/779,881, filed Feb. 28, 2013, now U.S. Pat. No. 8,694,224; Ser. No. 13/774,317, filed Feb. 22, 2013, now U.S. Pat. No. 9,269,263; Ser. No. 13/774,315, filed Feb. 22, 2013, and published Aug. 22, 2013 as U.S. Publication No. US-2013-0215271; Ser. No. 13/681,963, filed Nov. 20, 2012, now U.S. Pat. No. 9,264,673; Ser. No. 13/660,306, filed Oct. 25, 2012, now U.S. Pat. No. 9,146,898; Ser. No. 13/653,577, filed Oct. 17, 2012, now U.S. Pat. No. 9,174,574; and/or Ser. No. 13/534,657, filed Jun. 27, 2012, and published Jan. 3, 2013 as U.S. Publication No. US-2013-0002873, and/or U.S. provisional application Ser. No. 61/981,938, filed Apr. 21, 2014; Ser. No. 61/981,937, filed Apr. 21, 2014; Ser. No. 61/977,941, filed Apr. 10, 2014; Ser. No. 61/977,940. filed Apr. 10, 2014; Ser. No. 61/977,929, filed Apr. 10, 2014; Ser. No. 61/977,928, filed Apr. 10, 2014; Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/953,970, filed Mar. 17, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/941,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. No. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911,666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; and/or Ser. No. 61/819,835, filed May 6, 2013, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2010/099416; WO 2011/028686 and/or WO 2013/016409, and/or U.S. Pat. Publication No. US 2010-0020170, and/or U.S. patent application Ser. No. 13/534,657, filed Jun. 27, 2012, and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. Publication No. US-2009-0244361 and/or U.S. patent application Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO/2009/036176 and/or WO/2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,881,496; 7,720,580; 7,038,577; 5,929,786 and/or 5,786,772, and/or U.S. provisional application Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009, now U.S. Pat. No. 9,487,144, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for displaying video images derived at least in part from image data captured by at least one camera of a vehicular multi-camera vision system, said method comprising:
   disposing a plurality of cameras at a vehicle, wherein each camera comprises a two dimensional array of a plurality of photosensing elements;
   wherein disposing the plurality of cameras at the vehicle comprises disposing a rear-mounted camera at a rear portion of the vehicle so that said rear-mounted camera has a field of view at least rearward of the vehicle;
   wherein disposing the plurality of cameras at the vehicle comprises disposing a front-mounted camera at a front portion of the vehicle so that said front-mounted camera has a field of view at least forward of the vehicle;
   wherein disposing the plurality of cameras at the vehicle comprises disposing a driver side-mounted camera at a driver side portion of the vehicle so that said driver side-mounted camera has a field of view at least sideward of the vehicle;
   wherein disposing the plurality of cameras at the vehicle comprises disposing a passenger side-mounted camera at a passenger side portion of the vehicle so that said passenger side-mounted camera has a field of view at least sideward of the vehicle;
   providing a control comprising an image processor operable to process image data captured by the cameras of the plurality of cameras;
   disposing a display device in the vehicle that is viewable by a driver of the vehicle, and wherein the display device comprises a video display screen;
   capturing image data via the cameras of the plurality of cameras;
   providing captured image data to the control;
   processing captured image data at the control;
   displaying, via the video display screen, video images derived at least in part from image data captured by at least one camera of the plurality of cameras;
   controlling a display intensity of video images displayed by the video display screen;
   determining an exterior ambient light level within the field of view of at least one of the cameras of the plurality of cameras;
   responsive to determination of a reduction in exterior ambient light level within the field of view of the at least one of the cameras, holding display intensity of video images displayed by the video display screen to within 15 percent of the display intensity that was displayed before the determination of the reduction in exterior ambient light level; and
   wherein holding display intensity comprises (a) adjusting, via the control, exposure time for image data capture by the at least one camera of the plurality of cameras and (b) at least one of (i) adjusting, via the control, frame rate of image data capture by the at least one camera of the plurality of cameras and (ii) adjusting, via the control, gain of the at least one camera of the plurality of cameras.

2. The method of claim 1, wherein adjusting exposure time comprises adjusting, via the control, and responsive to determination of a reduction in exterior ambient light level within the field of view of the at least one of the cameras, exposure time for image data captured by the at least one camera of the plurality of cameras to hold display intensity of video images displayed by the video display screen to within 10 percent of the display intensity that was displayed before the determination of the reduction in exterior ambient light level.

3. The method of claim 1, wherein adjusting exposure time comprises increasing, via the control, and responsive to determination of a reduction in exterior ambient light level within the field of view of the at least one of the cameras, exposure time of the at least one camera of the plurality of cameras.

4. The method of claim 3, wherein adjusting exposure time comprises increasing, via the control, and responsive to determination of a reduction in exterior ambient light level within the field of view of the at least one of the cameras, exposure time of the at least one camera of the plurality of cameras to a multiple of the exposure time used at higher ambient lighting levels.

5. The method of claim 1, comprising controlling, via the control, the at least one camera of the plurality of cameras to provide a consistent display intensity of displayed video images irrespective of whether the vehicle is operated at nighttime in a rural driving environment or a city driving environment.

6. The method of claim 1, comprising controlling, via the control, an analog gain of at least one of the cameras of the plurality of cameras.

7. The method of claim 1, comprising adjusting, via the control, and responsive to determination of a reduction in exterior ambient light level within the field of view of the at least one of the cameras, (i) exposure time for image data capture by the at least one of the cameras of the plurality of cameras and (ii) frame rate of image data capture by the at least one of the cameras of the plurality of cameras.

8. The method of claim 7, wherein adjusting exposure time comprises adjusting, via the control, and responsive to determination of a reduction in exterior ambient light level within the field of view of the at least one of the cameras, exposure time for image data capture by the at least one of the cameras of the plurality of cameras to a longer exposure time and adjusting their frame rate to a slower frame rate.

9. The method of claim 1, comprising decoupling color processing and luminance processing of image data captured by the at least one of the cameras of the plurality of cameras to improve detail visibility.

10. The method of claim 1, wherein the vehicular multi-camera vision system comprises a bird's eye-view vision system.

11. The method of claim 1, wherein displaying video images via the video display screen comprises displaying, via the video display screen, video images, as viewed by a driver of the vehicle, with a display intensity greater than 200 candelas per square meter.

12. The method of claim 11, comprising controlling, via the control, illumination in displayed video images derived, at least in part, from image data captured by at least one of the cameras of the plurality of cameras.

13. A method for displaying video images derived at least in part from image data captured by at least one camera of a vehicular multi-camera vision system, said method comprising:
 disposing a plurality of cameras at a vehicle, wherein each camera comprises a two dimensional array of a plurality of photosensing elements;
 wherein disposing the plurality of cameras at the vehicle comprises disposing a rear-mounted camera at a rear portion of the vehicle so that said rear-mounted camera has a field of view at least rearward of the vehicle;
 wherein disposing the plurality of cameras at the vehicle comprises disposing a front-mounted camera at a front portion of the vehicle so that said front-mounted camera has a field of view at least forward of the vehicle;
 wherein disposing the plurality of cameras at the vehicle comprises disposing a driver side-mounted camera at a driver side portion of the vehicle so that said driver side-mounted camera has a field of view at least sideward of the vehicle;
 wherein disposing the plurality of cameras at the vehicle comprises disposing a passenger side-mounted camera at a passenger side portion of the vehicle so that said passenger side-mounted camera has a field of view at least sideward of the vehicle;
 providing a control comprising an image processor operable to process image data captured by the cameras of the plurality of cameras;
 disposing a display device in the vehicle that is viewable by a driver of the vehicle, and wherein the display device comprises a video display screen;
 capturing image data via the cameras of the plurality of cameras;
 providing captured image data to the control;
 processing captured image data at the control;
 displaying, via the video display screen, video images derived at least in part from image data captured by at least one of the cameras of the plurality of cameras;
 controlling a display intensity of video images displayed by the video display screen;
 determining an exterior ambient light level within the field of view of at least one of the cameras of the plurality of cameras;
 responsive to determination of a reduction in exterior ambient light level within the field of view of the at least one of the cameras, holding display intensity of video images displayed by the video display screen to within 15 percent of the display intensity that was displayed before the determination of the reduction in exterior ambient light level;
 wherein holding display intensity comprises (a) adjusting, via the control, exposure time for image data capture by the at least one of the cameras of the plurality of cameras and (b) adjusting frame rate of image data capture by the at least one of the cameras of the plurality of cameras;
 wherein adjusting exposure time comprises adjusting, via the control, and responsive to determination of a reduction in exterior ambient light level within the field of view of the at least one of the cameras, exposure time for image data capture by the at least one of the cameras of the plurality of cameras to a longer exposure time and adjusting the frame rate to a slower frame rate; and
 wherein the vehicular multi-camera vision system comprises a bird's eye-view vision system.

14. The method of claim 13, wherein adjusting exposure time comprises increasing, via the control, and responsive to determination of a reduction in exterior ambient light level within the field of view of the at least one of the cameras, exposure time of the at least one of the cameras of the plurality of cameras to a multiple of the exposure time used at higher ambient lighting levels.

15. The method of claim 13, comprising controlling, via the control, the at least one camera of the plurality of cameras to provide a consistent display intensity of displayed video images irrespective of whether the vehicle is operated at nighttime in a rural driving environment or a city driving environment.

16. The method of claim 13, comprising controlling, via the control, an analog gain of at least one of the cameras of the plurality of cameras.

17. A method for displaying video images derived at least in part from image data captured by at least one camera of a vehicular multi-camera vision system, said method comprising:
 disposing a plurality of cameras at a vehicle, wherein each camera comprises a two dimensional array of a plurality of photosensing elements;
 wherein disposing the plurality of cameras at the vehicle comprises disposing a rear-mounted camera at a rear portion of the vehicle so that said rear-mounted camera has a field of view at least rearward of the vehicle;
 wherein disposing the plurality of cameras at the vehicle comprises disposing a front-mounted camera at a front portion of the vehicle so that said front-mounted camera has a field of view at least forward of the vehicle;
 wherein disposing the plurality of cameras at the vehicle comprises disposing a driver side-mounted camera at a driver side portion of the vehicle so that said driver side-mounted camera has a field of view at least sideward of the vehicle;

wherein disposing the plurality of cameras at the vehicle comprises disposing a passenger side-mounted camera at a passenger side portion of the vehicle so that said passenger side-mounted camera has a field of view at least sideward of the vehicle;

providing a control comprising an image processor operable to process image data captured by the cameras of the plurality of cameras;

disposing a display device in the vehicle that is viewable by a driver of the vehicle, and wherein the display device comprises a video display screen;

capturing image data via the cameras of the plurality of cameras;

providing captured image data to the control;

processing captured image data at the control;

displaying, via the video display screen, video images derived at least in part from image data captured by at least one camera of the plurality of cameras;

controlling a display intensity of video images displayed by the video display screen;

determining an exterior ambient light level within the field of view of at least one of the cameras of the plurality of cameras;

responsive to determination of a reduction in exterior ambient light level within the field of view of the at least one of the cameras, holding display intensity of video images displayed by the video display screen to within 15 percent of the display intensity that was displayed before the determination of the reduction in exterior ambient light level;

wherein holding display intensity comprises (a) adjusting, via the control, exposure time for image data capture by the at least one camera of the plurality of cameras and (b) at least one of (i) adjusting, via the control, frame rate of image data capture by the at least one camera of the plurality of cameras and (ii) adjusting, via the control, gain of the at least one camera of the plurality of cameras;

wherein adjusting exposure time comprises adjusting, via the control, and responsive to determination of a reduction in exterior ambient light level within the field of view of the at least one of the cameras, exposure time for image data capture by the at least one camera of the plurality of cameras to a longer exposure time and adjusting frame rate of image data capture by the at least one camera of the plurality of cameras to a slower frame rate; and wherein displaying video images via the video display screen comprises displaying, via the video display screen, video images, as viewed by a driver of the vehicle, with a display intensity greater than 200 candelas per square meter.

18. The method of claim 17, comprising decoupling color processing and luminance processing of image data captured by at least one of the cameras of the plurality of cameras to improve detail visibility.

19. The method of claim 17, wherein the vehicular multi-camera vision system comprises a bird's eye-view vision system.

20. The method of claim 17, comprising controlling, via the control, illumination in displayed video images derived, at least in part, from image data captured by at least one of the cameras of the plurality of cameras.

* * * * *